US012612003B2

(12) United States Patent
    Endo

(10) Patent No.: US 12,612,003 B2
(45) Date of Patent: Apr. 28, 2026

(54) GUARD MEMBER

(71) Applicant: TOYOTA JIDOSHA KABUSHIKI KAISHA, Toyota (JP)

(72) Inventor: Yoshiki Endo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 18/451,605

(22) Filed: Aug. 17, 2023

(65) Prior Publication Data

US 2024/0075894 A1     Mar. 7, 2024

(30) Foreign Application Priority Data

Sep. 7, 2022     (JP) ................................. 2022-142524

(51) Int. Cl.
    *B60R 19/54*          (2006.01)
    *B60K 1/04*           (2019.01)
    *B62D 35/02*          (2006.01)

(52) U.S. Cl.
    CPC ................ *B60R 19/54* (2013.01); *B60K 1/04* (2013.01); *B60K 2001/0438* (2013.01); *B62D 35/02* (2013.01)

(58) Field of Classification Search
    CPC ... B60R 19/16; B60R 19/54; B60R 2019/005; B62D 35/001; B62D 35/02; B60K 2001/0438; B60K 1/04; H01M 50/242; H01M 50/233; H01M 50/244
    USPC ........................................ 293/112; 296/180.4
    See application file for complete search history.

(56) References Cited

U.S. PATENT DOCUMENTS

| | | | | |
|---|---|---|---|---|
| 10,259,510 | B2 * | 4/2019 | Logounov | .............. B62D 35/02 |
| 2011/0068605 | A1 * | 3/2011 | Domo | .................... B62D 35/02 |
| | | | | 296/180.1 |
| 2017/0299006 | A1 * | 10/2017 | Shi | ......................... F16D 65/847 |
| 2017/0349224 | A1 * | 12/2017 | Logounov | ............ B62D 35/001 |
| 2020/0010128 | A1 * | 1/2020 | Herlem | .................. B62D 35/02 |

(Continued)

FOREIGN PATENT DOCUMENTS

| | | | | | |
|---|---|---|---|---|---|
| EP | 2607215 | A2 * | 6/2013 | ........... | B62D 35/005 |
| JP | H09123950 | A * | 5/1997 | | |
| JP | 2019-188976 | A | 10/2019 | | |

(Continued)

OTHER PUBLICATIONS

Translation JP-7210940.*
Translation JP-H09123950.*
Translation EP-2607215.*

*Primary Examiner* — Amy R Weisberg
*Assistant Examiner* — Denise Lynne Esquivel
(74) *Attorney, Agent, or Firm* — Finnegan, Henderson, Farabow, Garrett and Dunner, LLP

(57)                    ABSTRACT

The guard member is a guard member that protects the front of a payload located under the floor of the vehicle. The guard member has a first oblique side inclined so as to extend downward from the front side toward the rear side of the vehicle, and a second oblique side inclined so as to extend laterally from the front side toward the rear side of the vehicle. When an angle between a horizontal straight line along a front-rear direction of the vehicle and the first oblique side is an angle α, and an angle between the straight line and the second oblique side is an angle β, a relationship of the angle α>the angle β is satisfied.

5 Claims, 1 Drawing Sheet

(56)                    References Cited

U.S. PATENT DOCUMENTS

2024/0383546 A1 * 11/2024 Saito ................... B62D 35/005

FOREIGN PATENT DOCUMENTS

JP        2020-183222 A      11/2020
JP            7210940 B2 *   1/2023

* cited by examiner

GUARD MEMBER

CROSS-REFERENCE TO RELATED APPLICATION

This application claims priority to Japanese Patent Application No. 2022-142524 filed on Sep. 7, 2022, incorporated herein by reference in its entirety.

BACKGROUND

1. Technical Field

The present disclosure relates to a guard member.

2. Description of Related Art

Japanese Unexamined Patent Application Publication No. 2019-188976 (JP 2019-188976 A) discloses a protector for protecting a mounted object disposed below a floor of a vehicle. The protector has a flat plate shape and is disposed in front of a battery pack that is a mounted object, and protects the battery pack, a power line, and the like in the event of a vehicle collision.

SUMMARY

However, when a vehicle runs on a falling object on a road while traveling on the road, the protector cannot disperse an impact depending on the shape and the rigidity of the falling object and the speed of the vehicle, and there is a possibility that the impact is applied to a mounted object.

The present disclosure has been made in view of the above issue, and an object of the present disclosure is to provide a guard member capable of protecting the mounted object located below a floor of the vehicle.

A guard member according to the present disclosure is a guard member for protecting a front of a mounted object located below a floor of a vehicle. The guard member includes:

a first oblique side inclined so as to spread downward from a front of the vehicle toward a rear of the vehicle; and a second oblique side inclined so as to spread laterally from the front of the vehicle toward the rear of the vehicle.

When an angle between a horizontal straight line along a front-rear direction of the vehicle and the first oblique side is an angle $\alpha$, and an angle between the straight line and the second oblique side is an angle $\beta$, a relationship of the angle $\alpha$>the angle $\beta$ is satisfied.

According to such a configuration, it is possible to realize the guard member capable of protecting the mounted object located below the floor of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A guard member according to an embodiment of the present disclosure will be described with reference to the drawings. Incidentally, the constituent elements in the following embodiments include those that can be easily replaced by a person skilled in the art or those that are substantially the same.

Embodiment

Figure 1:
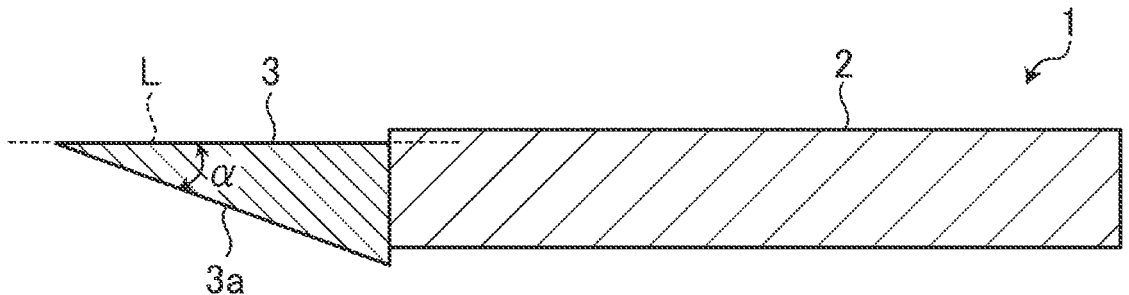
FIG. 1 is a configuration diagram of a guard member according to an embodiment.
Figure 2:
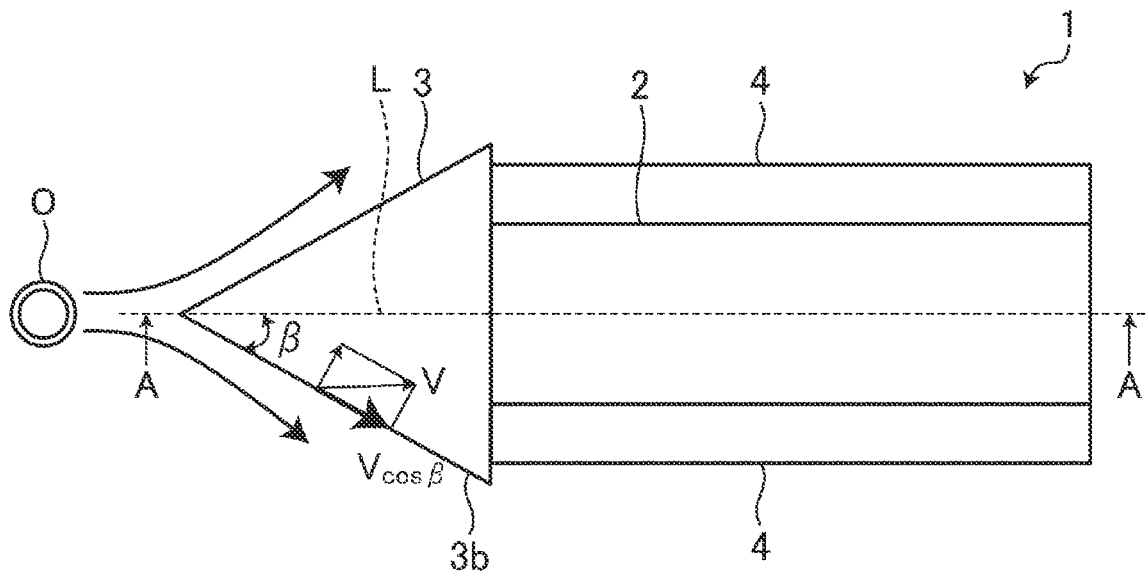
FIG. 2 is a configuration diagram of a guard member according to the embodiment.

FIG. 1 and FIG. 2 are structural views of a guard member according to the embodiment. The left side of FIGS. 1 and 2 corresponds to the front side of the vehicle, and the right side corresponds to the rear side of the vehicle. FIG. 1 is a cross-sectional view of a guard member 1 viewed from a side. FIG. 2 is a view of the guard member 1 viewed from below. FIG. 1 corresponds to A-A sectional view of FIG. 2.

The guard member 1 is a guard member that protects the front of the battery 2, which is a payload located under the floor of the vehicle. The payload is, for example, the battery 2, but is not particularly limited. The guard member 1 includes a front guard 3 for protecting the front of the battery 2 and a side frame 4 for protecting the side surface of the battery 2.

The front guard 3 has a first oblique side 3a inclined so as to extend downward from the front side toward the rear side of the vehicle, and a second oblique side 3b inclined so as to extend laterally from the front side toward the rear side of the vehicle.

The front guard 3 has a triangular pyramid shape formed by a plane including the first oblique side 3a and the second oblique side 3b. When the angle formed by the horizontal straight line L along the front-rear direction and the first oblique side 3a is an angle $\alpha$ and the angle formed by the straight line L and the second oblique side 3b is an angle $\beta$, the angle $\alpha$>the angle $\beta$ is satisfied. Further, the rear end of the first oblique side 3a is located below the lower end of the battery 2, and the rear end of the second oblique side 3b is located laterally from the side end of the battery 2. In other words, when the front guard 3 is viewed from the front, the front guard 3 is formed so as to protrude from the battery 2 at the lower side and the lateral side. The front guard 3 may have a cavity formed therein.

The side frames 4 are located on both sides of the battery 2 and protect both sides of the battery 2.

According to the embodiment described above, since the angle $\alpha$>the angle $\beta$ is satisfied, when the vehicle speed is V, the component Vcos $\beta$ in the second oblique side 3b direction>the component Vcos $\alpha$ in the first oblique side 3a direction holds. As a result, the faster the vehicle speed V is, the more likely the falling object O is to be received on the side of the vehicle than the falling object O is submerged below the vehicle, and the impact on the battery 2 by the falling object O can be reduced.

Further, according to the embodiment, since the front guard 3 has a triangular pyramid shape, the falling object O is more likely to be received on the side of the vehicle than the falling object O is submerged below the vehicle, so that it is possible to reduce the impact on the battery 2 by the falling object O.

Further, according to the embodiment, when the front guard 3 is viewed from the front, since the front guard 3 is formed so as to protrude from the battery 2 at the lower side and the side, it is possible to rectify the air passing through the lower portion of the vehicle and reduce the air resistance during traveling of the vehicle.

Additional benefits and variations can be readily derived by one of ordinary skill in the art. Thus, the broader aspects of the disclosure are not limited to the specific details and representative embodiments represented and described above. Accordingly, various modifications may be made without departing from the spirit or scope of the general inventive concept as defined by the appended claims and their equivalents.

What is claimed is:

1. A guard member for protecting a front of a mounted object located below a floor of a vehicle, the guard member comprising:

a front guard disposed in front of the mounted object, the front guard including a rear end surface and a bottom surface, the rear end surface facing a front end surface of the mounted object; and side frames disposed along both sides of the mounted object, wherein the bottom surface of the front guard forms a first oblique side that is inclined so as to spread downward from a front end of the front guard that faces toward a front of the vehicle toward the rear end surface of the front guard that faces toward a rear of the vehicle, a side surface of the front guard forms a second oblique side that is inclined so as to spread laterally from the front of the vehicle toward the rear of the vehicle, wherein an angle between a horizontal straight line along a front-rear direction of the vehicle and the first oblique side is an angle α, and an angle between the straight line and the second oblique side is an angle β, with a relationship of the angle α>the angle β being satisfied, and the mounted object is a battery.

2. The guard member according to claim 1, wherein the front guard has a triangular pyramid shape formed in part by the first oblique side and the second oblique side.

3. The guard member according to claim 1, wherein:

a rear end of the first oblique side is located in a lower position than a lower end of the mounted object; and a rear end of the second oblique side is located laterally from a lateral end of the mounted object.

4. The guard member according to claim 1, wherein the front guard has a cavity formed therein.

5. The guard member according to claim 1, wherein the bottom surface of the front guard consists of a single oblique surface that spreads downward from the front end of the front guard toward the rear end surface of the front guard.

* * * * *